United States Patent
Brimberg

[15] 3,682,504
[45] Aug. 8, 1972

[54] ROD COUPLER WITH SHEATH

[72] Inventor: Torsten Brimberg, Mellosa Box 21, Mellosa, Sweden

[22] Filed: March 19, 1971

[21] Appl. No.: 125,958

[30] Foreign Application Priority Data

June 22, 1970 Sweden ...................8569/70

[52] U.S. Cl. ...............................287/49, 287/54 B
[51] Int. Cl. ............................................F16b 7/04
[58] Field of Search........85/53, 55; 287/49, 51, 54 B

[56] References Cited

UNITED STATES PATENTS

| 3,512,813 | 5/1970 | Brimberg | 287/49 |
| 2,942,899 | 6/1960 | Rifken | 287/54 B |

FOREIGN PATENTS OR APPLICATIONS

| 408,381 | 9/1966 | Switzerland | 287/51 |
| 1,281,713 | 12/1961 | France | 85/55 |
| 890,049 | 2/1962 | Great Britain | 85/53 |

Primary Examiner—Andrew V. Kundrat
Attorney—Burns, Doane, Swecker & Mathis

[57] ABSTRACT

A coupler for releasably connecting two or more rods to one another when erecting structures such as shelving, storage racks, and the like with a plastic snap-on sheath to provide a smooth outer surface and facilitate dust removal and the maintenance of hygienic conditions for the structure.

2 Claims, 4 Drawing Figures

PATENTED AUG 8 1972  3,682,504

INVENTOR
TORSTEN BRIMBERG

BY Burns Doane Swecker & Mathis
ATTORNEYS

ROD COUPLER WITH SHEATH

The present invention relates to a detachable coupling device having a removable sheath. The coupling device is of the type which advantageously consists of two like coupling halves intended for detachable connection of two, three or more rods at specific angles, and may be used advantageously in the assembling of storage racks, plates, tables, partitions, and building scaffolds.

The coupling device as shown in the drawings is described in my U.S. Pat No. 3,512,813.

The coupling halves, each of which is provided with a groove for the reception of the rods that are joined together, are held in their coupling position by means of a tensioning connector. In an especially advantageous embodiment of the coupling device, the tensioning connector runs in the form of a threaded bolt between the two coupling halves. In order to impart to the coupling halves a smooth outer surface, it is advantageous to sink the screw or screw head of the connection, and possibly the nut. Since the coupling element of the type in question described above is used extensively for joining of work and display counters and shelves in food stores and in storage spaces for food, there is the hygienic requirement that the surfaces be as smooth as possible so that there can be no unnecessary collection of dust. In many connections, it is also desirable that the coupling halves be of a specific color. For economic reasons on an industrial scale it is not advantageous or desirable to maintain an inventory of coupling devices for rods of the same dimensions in a variety of colors.

It is an object of the invention to provide a novel sheath for use with the coupling devices to solve the above-indicated problem in a technically simple and economically advantageous way.

A further object of the invention is to provide a novel removable sheath for each part of a two-part coupling member wherein the sheath covers the tensioning device and provides a smooth surface for the coupling parts.

These and other objects of the invention will become more fully apparent from the claims and from the description as it proceeds in connection with the appended drawings, wherein:

The coupling device as illustrated is fully described and claimed in my U.S. Pat. No. 3,512,813. The coupling halves 1 are separable portions which are held together by the tensioning connector 5 in the form of a bolt whose cooperating nut is not shown. The tensioning connector acts along the central axis of each of the coupling halves 1. The rods 2, 3 and 4 are all mutually perpendicular, and may be used for structural purposes such as shelving, as well as for other purposes, as mentioned above.

Each coupling half 1 may comprise a shell of a hemisphere. Cut-out portions are provided to accommodate the rods to be clamped. With removal of the cut-out portions, there remain arcuate wing members which fit between the rods 2, 3 and 4. In the illustrated embodiment, each coupling half 1 has three arcuate wing members which are symmetrically disposed along 120° lines.

Figure 1:
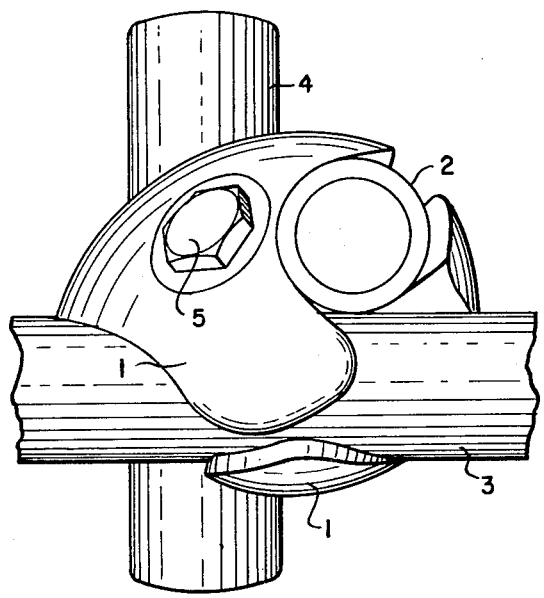
FIG. 1 shows a coupling device of a known type.
Figure 2:
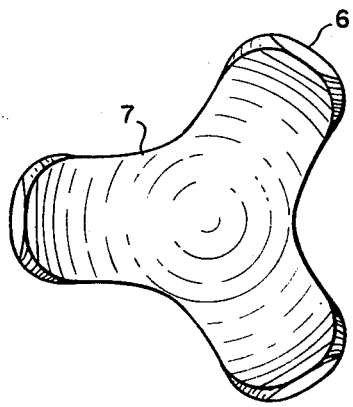
FIG. 2 is a plan view of the sheath that is adapted to fit over a portion of the coupling device of FIG. 1.
Figure 3:
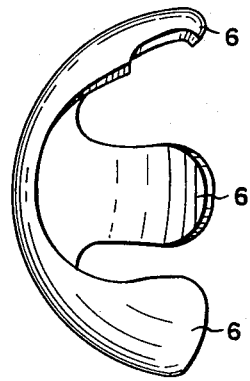
FIG. 3 is a side view of FIG. 2.

FIGS. 2 and 3 illustrate a sheath 7 of resilient plastic material shaped so that a cover for each coupling half is provided that can be snapped over the finished assembled coupling device. Sheath 7 is seen from the inside in a view from the top in FIG. 2 and from a side in FIG. 3.

The sheath 7 is thin-walled structure which also has the same number of arcuate legs as the coupling half 1 has of arcuate wing members. Each leg on sheath 7 is formed to totally cover the corresponding arcuate wing member.

On the end of each leg is a lip 6 which extends at an acute angle downwardly, as best shown in FIG. 3.

The lips 6 on the end of each leg are arranged to grip around the ends of the arcuate wing members of the coupling half 1 as snaps, so that the coupling sheath is set on the coupling element by snapping in place. Removal is accomplished by unsnapping for disassembly or replacement by a sheath of another color. The holes for the bolts or screws 5 and other depressions in the coupling device are covered by the sheath, so that the dirt cannot collect in them.

Figure 4:
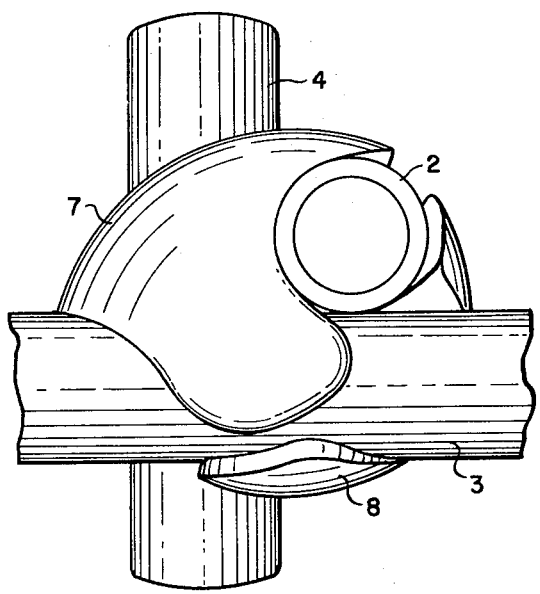
FIG. 4 shows the sheath in place on the coupling members constituting the coupling device of FIG. 1.

FIG. 4 shows the appearance of the coupling after the sheath has been set in place. The rods which are connected by means of the coupling device in this figure are also designated 2, 3 and 4, and the sheaths are designated 7 and 8. Both of the sheaths 7 and 8 for the two coupling halves 1 may be identical, and if desired, can be attached together so as to be only one piece.

It is clear that the coupling sheath 7 can be manufactured not only of plastic material such as polyethylene, although this has been found to be advantageous in most instances, but it can also be made of soft rubber and/or metal. As other suitable materials for the coupling sheath, there may be mentioned polypropylene and polyvinylchloride, and other plastics which can be prepared in various colors and which have sufficiently good properties of resilience.

The present invention may be embodied in other specific forms without departing from the spirit or essential characteristics thereof. The presently disclosed embodiment is, therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. In combination, a coupling device for connecting together at least two rod members at predetermined angles, the coupling device comprising two separable portions each having a central axis and three complementary arcuate wing members coupled to receive said rod members thereacross, each arcuate member having a substantially radially extending protuberance defining each open end of the arcuate portion thereof and on which the elongate members rest when received between the coupling portions with each rod member being disposed between two adjacent members, and tensioning means acting in the axial direction of the coupling for detachably connecting the two separable portions together; and a removable sheath of a resilient moldable material having a central portion with a smooth outer surface covering said tensioning means and arcuate legs fitting over and obscuring from view each of the arcuate wing members of said coupling portions, the ends of the arcuate legs each having a lip extending at an acute angle, and said lips on the ends of each leg snapping over to engage the end portions of the wing members on the coupling portion to thereby hold said sheath in place.

2. The combination of claim 1 together with a second sheath secured over the other coupling portion and wherein both sheaths are of identical size and shape.

* * * * *